United States Patent [19]

Hein

[11] 4,415,449
[45] Nov. 15, 1983

[54] VACUUM FILTRATION BENCH

[75] Inventor: Wolfgang Hein, Dassel, Fed. Rep. of Germany

[73] Assignee: Carl Schleicher & Schuell GmbH & Co. KG, Einbeck, Fed. Rep. of Germany

[21] Appl. No.: 418,131

[22] Filed: Sep. 15, 1982

[30] Foreign Application Priority Data

Sep. 25, 1981 [DE] Fed. Rep. of Germany ....... 3138256

[51] Int. Cl.$^3$ ............................................. B01D 23/26
[52] U.S. Cl. ................................. 210/406; 210/416.1; 422/101
[58] Field of Search ..................... 210/258, 341, 416.1, 210/406; 422/101

[56] References Cited

U.S. PATENT DOCUMENTS 4,247,399 1/1981 Pitesky ................................ 210/341

Primary Examiner—Frank Sever
Attorney, Agent, or Firm—Jordan and Hamburg

[57] ABSTRACT

A bench for vacuum filtration of fluid samples includes a stand having at least one aperture for receiving and supporting a filter device. A vacuum distribution conduit is rigidly mounted on the stand and a vacuum branch conduit extends between the vacuum distribution conduit and the filter device. An isolating valve is provided in the vacuum branch conduit.

15 Claims, 3 Drawing Figures

VACUUM FILTRATION BENCH

BACKGROUND OF THE INVENTION

This invention relates to a bench for vacuum filtration.

A "vacuum filtration bench" in the sense of the invention is a device which, according to its nature, is inserted between the connecting part of a vacuum source and a filter and which serves generically for the exposure of the filter with underpressure and for acceptance of the filtrate. A "filtration device" in the sense of the framework of the invention consists at least of one filter and also usually a support for the filter and a veseel for filling-in which forms a unit with these two other elements. The separate filtration device, thus defined, is not considered an element of the vacuum filtration bench in the sense of the invention. In principle the filtration devices may be of any nature, as long as they may be connected to the vacuum filtration bench in such a manner that vacuum filtration may be undertaken by underpressure. Filtration devices in that sense are for instance beaker-shaped or funnel-shaped open or closed filters or filter attachments for use with paper filters, membrane filters or filters of sintered material.

Vacuum filtration benches of the aforedescribed kind are utilized for a multiplicity of purposes in the most frequently used state of the art and serve particularly the simultaneous vacuum filtration of a multiplicity of fluid samples in the execution of serial investigations, particularly in the supervision of production quality, in particle control, the microbiological routine control of water, foodstuffs and beverages, as well to the supervision of the quality of pharmaceutical and cosmetic products (see for instance the prospectus "Vakuum-filtrationsgeraete" of the applicant, December 1980 edition).

A customary vacuum filtration bench of the named kind consists substantially of a central suction pipe which is connected rigidly with two lateral stand elements, thereby forming a stable bench. The suction pipe, arranged substantially horizontally, is closed tightly against vacuum at one side and has at its opposite side a connecting pipe for connection to a vacuum source. Branch pipes extend vertically upwardly from this horizontal suction pipe, an isolating valve being intercalated into the branch pipes which are formed at their upper ends in such a manner that they make a connection possible of a separate filtration device of the above defined kind. Customarily about two to ten filtration devices may be used simultaneously upon such a vacuum filtration bench.

Due to the ease of overlooking them and the easy accessability, their great stability, their small need of space and the negligible diminution of the workplace, such vacuum filtration benches result in a great easing of work, particularly on places of routine investigations. A disadvantage, though, of these vacuum filtration benches is that filtrates are sucked off in one central suction pipe and are lost thereby.

In order to prevent this disadvantage a vacuum filtration bench has been developed for research purposes (see also the abovenamed prospectus of the applicant) which is constructed in the manner of a multiple-suction-pot. Within a pot-like inferior part, which can be connected to a vacuum source by a connector pipe, are disposed ten filtrate acceptor vessels. The pot can be closed with a cover upon which the separate or individual filtration vessels may be positioned and from which the sucked off filtrate drips into the acceptor vessels. A disadvantage of this device is mainly, that the filtrations may not be executed independently of each other but must be executed simultaneously. Another disadvantage is that a danger of mixing of filtrates exists as well as by spraying and splattering of the filtrates as also by the vapor phase.

Based upon this state of the art, an object of the present invention is the provision of an improved vacuum filtration bench of the aforenamed kind where clean and separate catching of the filtrate is made possible while the mechanical stability, visual clearness, and compactness of the device are retained. Also the main characteristic of a single central connector is retained for connection of the device with a vacuum source and also the independent action of one filtration device relative to another filtration device.

The basic idea of the invention involves the use of conventional suction flasks, but to combine them in one single frame stand to form a battery, handable as a unit, the battery containing integrally a central vacuum distributor conduit so that the complete battery of suction flasks needs only one single connector conduit for connection to the vacuum source. Additionally, the capability is provided of shutting off each individual branch connection prior to the connection to the suction flask, such that the filtrate from any individual one may be collected and worked up without interrupting the filtering process in one of the other filtration devices of the vacuum filtration bench.

In order to stabilize the firmness of the suction flask in the square-shaped frame stand, it has preferentially an interstitial bottom, parallel to the bottom plate and upper side or cover plate and in which an interstitial bottom is disposed concentrically and planarly coinciding with each aperture on the upper side of the frame stand, additional apertures. Preferentially, all apertures of the frame stand have identical measures and are particularly circular apertures of identical diameter. In order to be capable to use, notwithstanding this construction of the frame stand, also suction flasks of differing dimensions, the vacuum filtration bench is preferentially supplied with sets of reduction rings which allow a stepwise reduction of the inner diameter of the apertures, this being particularly in an identical manner as regards the apertures in the upper side and, in given instances, in the intermedial bottom of the frame stand. Each of these reduction rings has substantially the shape of a relatively thick-walled cylinder ring carrying at its upper rim an external flange. By aid of this external flange each of the reducing rings abuts either the surface of the upper side of the frame stand or abuts the upper side of the external flange of a radially outside surrounding reducing ring. Particularly preferentially all reducing rings of one set have outer flanges with identical outer diameters.

According to one embodiment of the invention, the vacuum distributor conduit is preferably a tube, particularly an unsupported formstable pipe, which is led outside the frame stand and is supported at lateral extensions or projections of the lateral walls of the frame stand. The support is preferably formed as a disconnectable support, particularly as a plug-in connection. That makes possible easy accessability of the vacuum distribution conduit for cleaning and maintenance.

In one embodiment of the invention an isolating valve is preferably inserted between the suction flask and the filtration device for a more flexible handling of the vacuum filtration bench. In this case this isolating valve as well as the isolating valve in the vacuum branch conduit may be formed as a three-way valve which is able to aerate the vacuum flask at the closed vacuum branch conduit and, in given cases, to additionally close the filtrate feed conduit. Alternatively the suction flask may be aerated directly by a separate stopcock.

The frame stand, the vacuum distributor conduit and the stopcocks are preferably of plastic. The vacuum branch conduit, particularly, is formed flexible, for instance as a vacuum rubber hose.

Each vacuum filtration bench according to the invention may be furnished with two to ten filtration stations.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
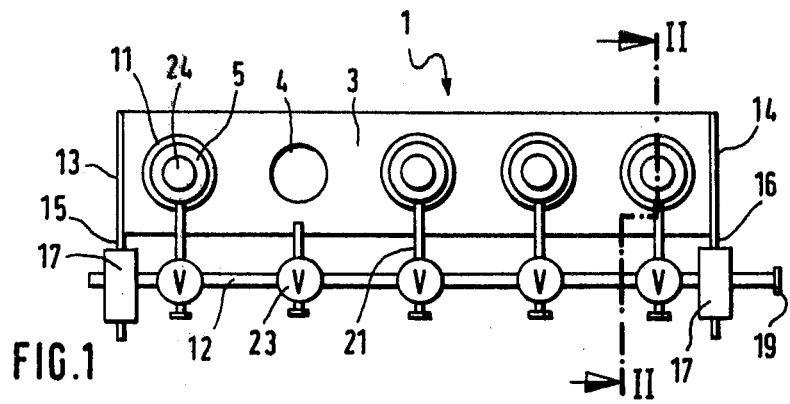
FIG. 1 is a schematic top view of a vacuum filtration bench according to one embodiment of the invention.
Figure 2:
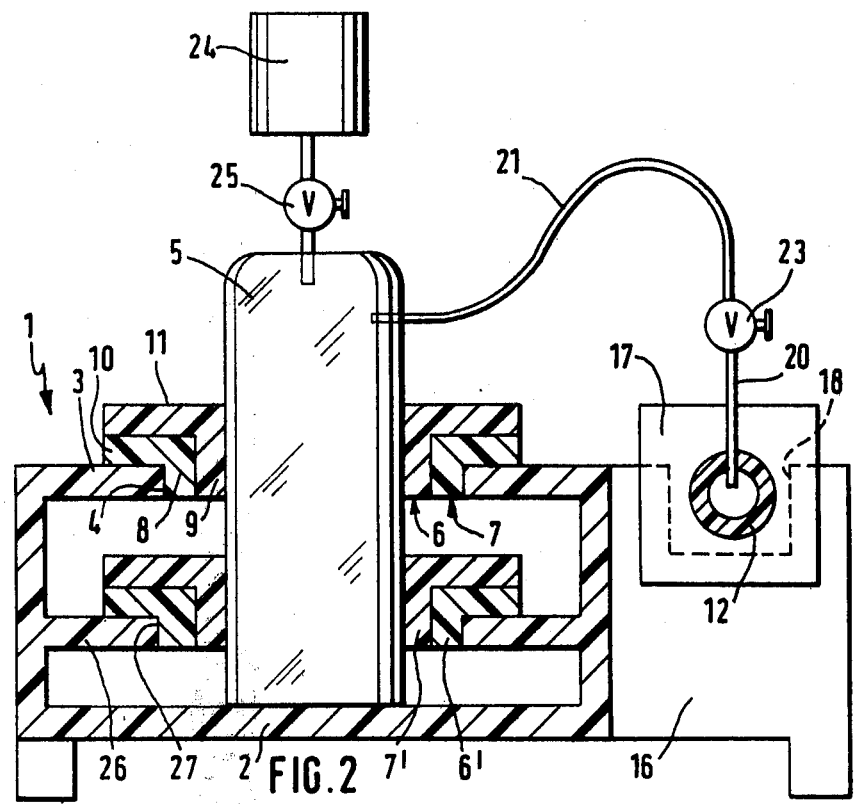
FIG. 2 is a sectional view taken along the line II—II in FIG. 1.

A top view of a first embodiment of the vacuum filtration bench is schematically shown in FIG. 1. FIG. 2 shows a sectional view taken along the line II—II in FIG. 1, also in schematical form. The vacuum filtration bench shown in FIGS. 1 and 2 consists substantially of a pronely disposed and at least substantially square-shaped frame stand 1 with closed bottom 2. In the upper side 3, disposed opposite bottom 2, there are formed a plurality of apertures 4 located side by side. In the embodiment shown there are altogether five. In each of apertures 4 stands a container or suction flask 5 whose bottom abuts the bottom 2 of the frame stand 1. The inner rim of aperture 4 surrounds at close fit (FIG. 3) the suction flask 5 in order to stabilize its position. When for instance cylindrical suction flasks 5 are used, the diameter of the apertures 4 are chosen so that it agrees with the area of tolerance of the diameter of the suction flasks which is demanded by tolerances in manufacturing conditions. The inner rim of aperture 4 may be clad with an elastically deformable material, a lip-seal for instance, or may be supplied with spring elements so that also within areas of tolerance the suction flasks may be gripped or held by springs or clamps. All five apertures 4 in the upper side 3 of the frame stand 1 have identical diameters.

In order to be capable of also securely mounted and stabilizing suction flasks of relatively small diameter in the relatively large insertion apertures 4, a set of reducing rings 6,7 (FIG. 2) is provided for each aperture 4 and these may be used each time when needed. The rings serve to reduce the open diameter of aperture 4. Each of the reducing rings 6,7 have substantially the shape of a relatively thick-walled flat cylindrical ring 8 or 9, respectively, to whose upper rim is integrally adhered a circular-shaped outer flange 10 or 11, respectively. The outer rim of the cylindrical part 8 of the largest reducing ring 7 of the set abuts at a close fit the inner rim of aperture 4 in the upper side reducing ring 7 in the aperture. The outer flange 10 of reducing ring 7 rests upon the upper plane of upper side 3 of stand frame 1 and thereby holds the whole reducing ring 7 in the aperture. The inner reducing ring 6 is similarly shaped and the outer mantle of its cylindrical section 9 abuts and form-fits with the inner mantle of the outer reducing ring 7. The inner reducing ring 6 is supported by its outer flange 11 upon the upper plane of the outer flange 10 of the outer reducing ring 7. The outer flange 10 of the outer reducing ring 7 and the outer flange 11 of the inner reducing ring 6 have identical outer diameters.

The vacuum filtration bench contains furthermore as an integrated component that is solidly connected to the stand fram 1 a vacuum distribution conduit 12. In the embodiment shown in FIGS. 1 and 2, the vacuum distributor conduit 12 is fastened outside the frame stand 1 to lateral extensions 15 or 16 respectively of the lateral walls 13 or 14, respectively of frame stand 1. The fastening is constructed as a detachable clamp connection or plug-in connection, respectively. A plug-in block 17, provided with an edge groove running around it, is connected on each side rigidly to the vacuum distributor conduit that is formed as a rigid pipe and is disposed in a recess 18 of the extension 16 of the lateral wall 14 or is plugged, respectively, in a corresponding recess, not shown in the drawings, of the extension 15 of the sidewall 13, the rim of the vacuum distributor conduit 12 meshing like a spring with the edge groove of the plug-in block 17.

Figure 3:
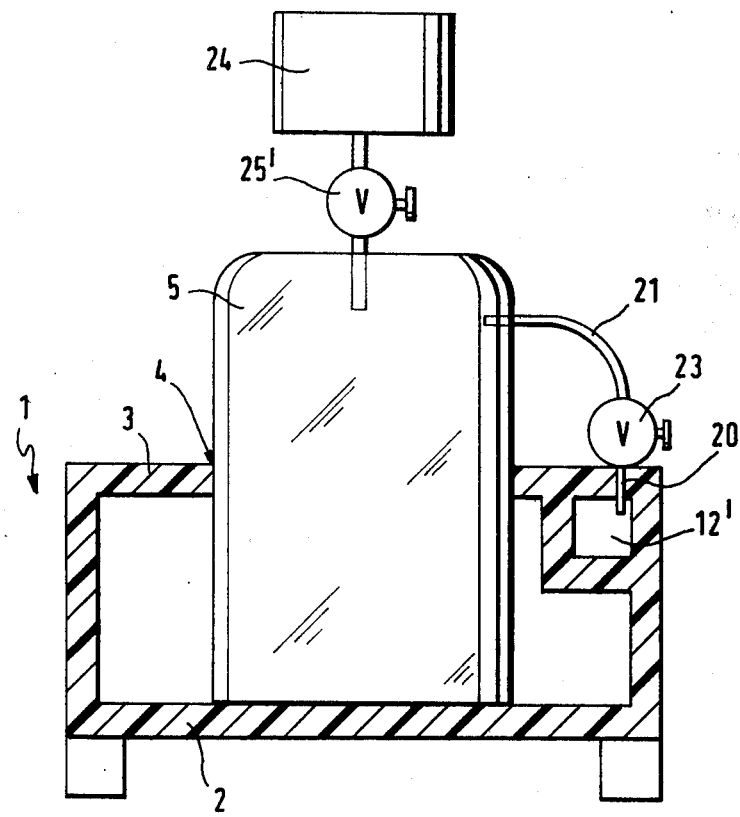
FIG. 3 is a schematic view, similar to FIG. 2, but showing an alternate embodiment.

In the embodiment shown in FIG. 3, on the other hand, the vacuum distributor conduit 12' is formed as an integrally molded component of the stand frame 1 and is disposed at the inside.

The vacuum distributor conduit 12' (FIG. 3) is, like the vacuum distributor conduit 12 (FIGS. 1 and 2) formed closed at one side. At the opposite end a connection 19 is provided for a vacuum source, not shown in the drawing. In principle, this connection may be of any kind, for instance a flange connection, a plug connection or a screw connection.

From the vacuum distributor conduit 12 or 12', respectively, vacuum branch conduits 20,21 branch off, each of them containing an isolating valve, and provide by a flexible section 21, for example a rubber vacuum hose, a vacuum connection between the vacuum distributor conduit 12 or 12', respectively and the filter flask 5. Each of the filter flasks 5 may be connected to a separate filtration device 24. Between the filtration device 24 and the filter flask 5 is inserted an isolating valve 25. In the embodiment shown in FIG. 3 the isolating valve 25' is formed as a three-way cock, which allows aeration of filter flask 5. Instead or additionally the isolating valve 23 in the vacuum branch conduit 20,21 may also be formed as a three-way cock.

As shown in FIG. 2 a horizontal solid intermediate bottom 26 is disposed in frame stand 1 between its upper side 3 and its bottom 2. This intermediate bottom 26 has apertures 27 concentric to each aperture 4 in the upper side 3 of frame stand 1, such apertures 27 each having the identical cross section as the apertures 4 in the upper side 3 of the stand frame 1. Wnen one or more reducing rings 6,7 are set into aperture 4 of upper side 3, corresponding rings 6',7' are also set into each corresponding aperture 27 of the intermediate bottom 26, whereby a maximum stabilization is obtained, not only of the individual filter flask 5 but also of the total system of the vacuum filtration bench.

The frame stand 1 with all its parts, the reducing rings 6,7, the vacuum distribution conduit 12 with all its parts and the valves 23 and 25 are preferably of plastic. The filter flask is preferably of glass. The construction of the separate filtration devices 24, not counting as components of the vacuum filtration bench is, in principle, open to choice.

What I claim is:

1. A bench for vacuum filtration of fluid samples comprising bench means in the form of a stand which is generally horizontally disposed, said stand having a closed bottom, aperture means on said stand defining a plurality of apertures overlying said bottom, a plurality of filtration means each comprising a filtration device and a suction flask, each of said suction flasks which may be of differing sizes being supported on said bottom of said stand and each being received close fitted in one of said apertures, a vacuum distribution conduit rigidly mounted on said stand, a connector on said vacuum distribution conduit for connection to a vacuum source, a plurality of vaccum branch conduits, each of said branch conduits extending between said vacuum distribution conduit and one of said suction flasks, each of said vacuum branch conduits being provided with an isolating valve between each of said suction flasks and said vacuum distribution conduit, and a plurality of vacuum connections, each of said vacuum connections being provided between each of said branch conduits and each of said suction flasks arranged so as to enable filtrate from any individual filtration means to be collected and worked up without interruption to the filtration process of all or any other of said filtration means.

2. A bench for vacuum filtration according to claim 1 wherein each of said apertures have the same dimensions.

3. A bench for vacuum filtration according to claim 1 wherein said stand has an upper section and an intermediate section disposed between said upper section and said bottom, said means defining said aperture comprising axially aligned and identically dimensioned apertures in said upper section and said lower section.

4. A bench for vacuum filtration according to claim 3 wherein said aperture means further comprises at least one reducing ring disposed in said aperture for reducing the size of the aperture for receiving smaller suction flasks.

5. A bench for vacuum filtration according to claim 4 wherein a pair of said reducing rings are provided one within the other to thereby further reduce the size of the aperture for thereby receiving even smaller suction flasks.

6. A bench for vacuum filtration according to claim 5 wherein said pair of reducing rings are disposed in said upper section and another pair of said reducing rings are disposed in said intermediate section.

7. A bench for vacuum filtration according to claim 5 wherein each of said reducing rings of said pair are each provided with a flange at their respective upper rim.

8. A bench for vaccum filtration according to claim 4 wherein said reducing ring is disposed in said upper and lower section.

9. A bench for vacuum filtration according to claim 4 wherein said reducing ring is a cylindrical ring provided with a flange at its upper rim.

10. A bench for vacuum filtration according to claim 1 wherein said stand has lateral walls with lateral extensions extending from said lateral walls, said vacuum distribution conduit being supported outside of said stand on said lateral extensions.

11. A bench for vacuum filtration according to claim 10 further comprising means detachably supporting said vacuum distribution conduit on said lateral extensions.

12. A bench for vacuum filtration according to claim 11 wherein said vacuum distribution conduit is rigid and said vacuum branch conduits are at least partially flexible.

13. A bench for vacuum filtration according to claim 1 wherein said isolating valve is a 3-way valve to selectively connect said suction flask to said vacuum distribution conduit, to block said connection between said suction flask and said vacuum distribution conduit, or to connect said suction flask to ambient air.

14. A bench for vacuum filtration according to claim 1 further comprising a conduit with an isolating valve between said suction flask and said filtration device.

15. A bench for vacuum filtration according to claim 14 wherein said isolating valve is a 3-way valve to selectively connect said suction flask to said filtration device, to block the last said connection, or to connect said suction flask to ambient air.

* * * * *